(12) United States Patent
Heindl

(10) Patent No.: US 9,695,920 B2
(45) Date of Patent: Jul. 4, 2017

(54) AGRICULTURAL VEHICLE TRANSMISSION

(71) Applicant: AGCO International GmbH, Hesston, KS (US)

(72) Inventor: Richard Heindl, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/438,780

(22) PCT Filed: Dec. 23, 2013

(86) PCT No.: PCT/EP2013/077914
§ 371 (c)(1),
(2) Date: Apr. 27, 2015

(87) PCT Pub. No.: WO2014/096448
PCT Pub. Date: Jun. 26, 2014

(65) Prior Publication Data
US 2015/0292607 A1    Oct. 15, 2015

(30) Foreign Application Priority Data

Dec. 21, 2012  (GB) .................................. 1223536.2

(51) Int. Cl.
*F16H 37/08* (2006.01)
*B60K 17/346* (2006.01)
(Continued)

(52) U.S. Cl.
CPC ......... *F16H 37/084* (2013.01); *B60K 17/346* (2013.01); *B60K 17/356* (2013.01);
(Continued)

(58) Field of Classification Search
CPC ..... F16H 37/084; F16H 47/04; B60K 17/346; B60K 17/356; B60K 17/36
(Continued)

(56) References Cited

U.S. PATENT DOCUMENTS 4,997,412 A  3/1991  Reed
5,026,333 A  6/1991  Meyerle
(Continued)

FOREIGN PATENT DOCUMENTS

EP  2466168 A1  6/2012
GB  1308318 A  2/1973

OTHER PUBLICATIONS

International Patent Office, International Search Report for UK Patent Application No. GB1223536.2, transmittal dated Aug. 22, 2013.
(Continued)

*Primary Examiner* — Anne Marie Boehler
*Assistant Examiner* — Michael Stabley

(57) ABSTRACT

A continuously variable transmission for an agricultural vehicle, the transmission comprising a transmission casing and transmission components, the components including: an input shaft drivable by a prime mover, first and second output drive shafts for connection to driven wheels of the vehicle, a mechanical transmission branch which transfers torque mechanically from the input shaft to the first and second output shafts, and a further transmission branch having at least one continuously variable motor, wherein the first and second output drive shafts are additionally driven by the at least one motor so as to provide the first and second output drive shafts with continuously variable drive.

10 Claims, 12 Drawing Sheets

(51) Int. Cl.
*B60K 17/36* (2006.01)
*F16H 47/04* (2006.01)
*B60K 17/356* (2006.01)

(52) U.S. Cl.
CPC ............. *B60K 17/36* (2013.01); *F16H 47/04* (2013.01); *B60Y 2200/1422* (2013.01)

(58) Field of Classification Search
USPC ........................................................ 180/242
See application file for complete search history.

(56) References Cited

U.S. PATENT DOCUMENTS

| | | | |
|---|---|---|---|
| 5,139,465 A | 8/1992 | Sato | |
| 7,063,638 B2* | 6/2006 | Weeramantry | F16H 47/04 475/74 |
| 8,747,266 B2* | 6/2014 | Aitzetmueller | F16H 47/04 475/6 |
| 2005/0054469 A1 | 3/2005 | Dyck | |
| 2005/0109549 A1 | 5/2005 | Morrow | |
| 2008/0277182 A1 | 11/2008 | Heindl | |
| 2010/0285913 A1* | 11/2010 | Burjes | B60K 17/346 475/72 |
| 2011/0166752 A1* | 7/2011 | Dix | F16H 61/472 701/50 |
| 2012/0157254 A1* | 6/2012 | Aitzetmueller | F16H 47/04 475/31 |

OTHER PUBLICATIONS

European Receiving Office, International Search Report for International Patent Application No. PCT/EP2013/077914, date of mailing Mar. 12, 2014.

* cited by examiner

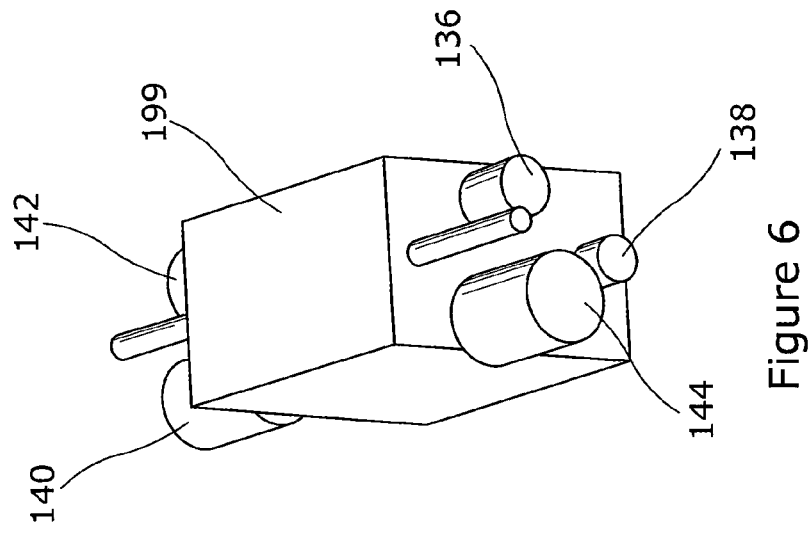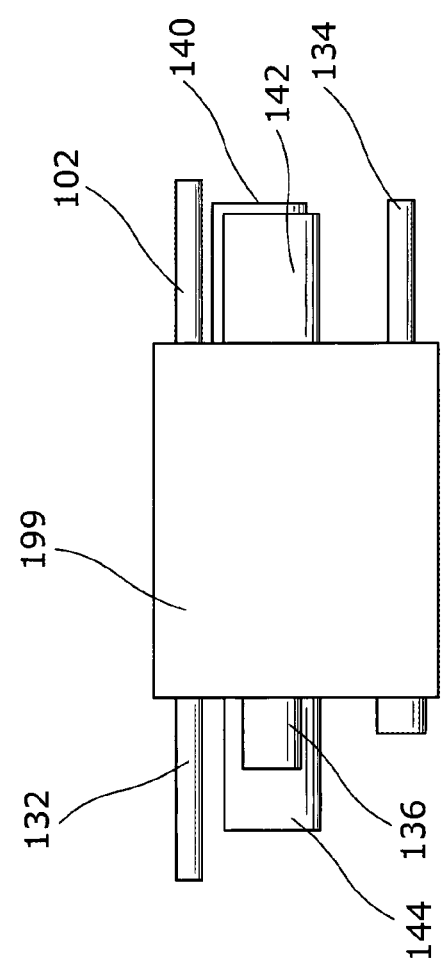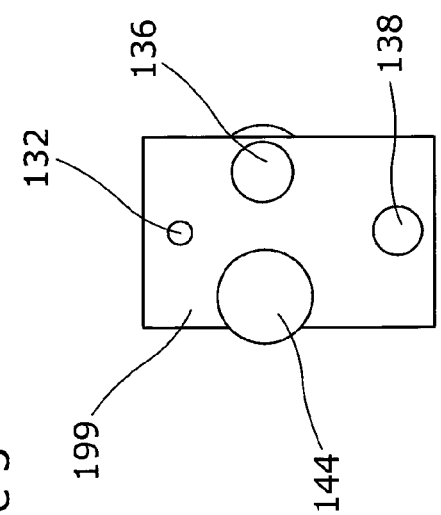

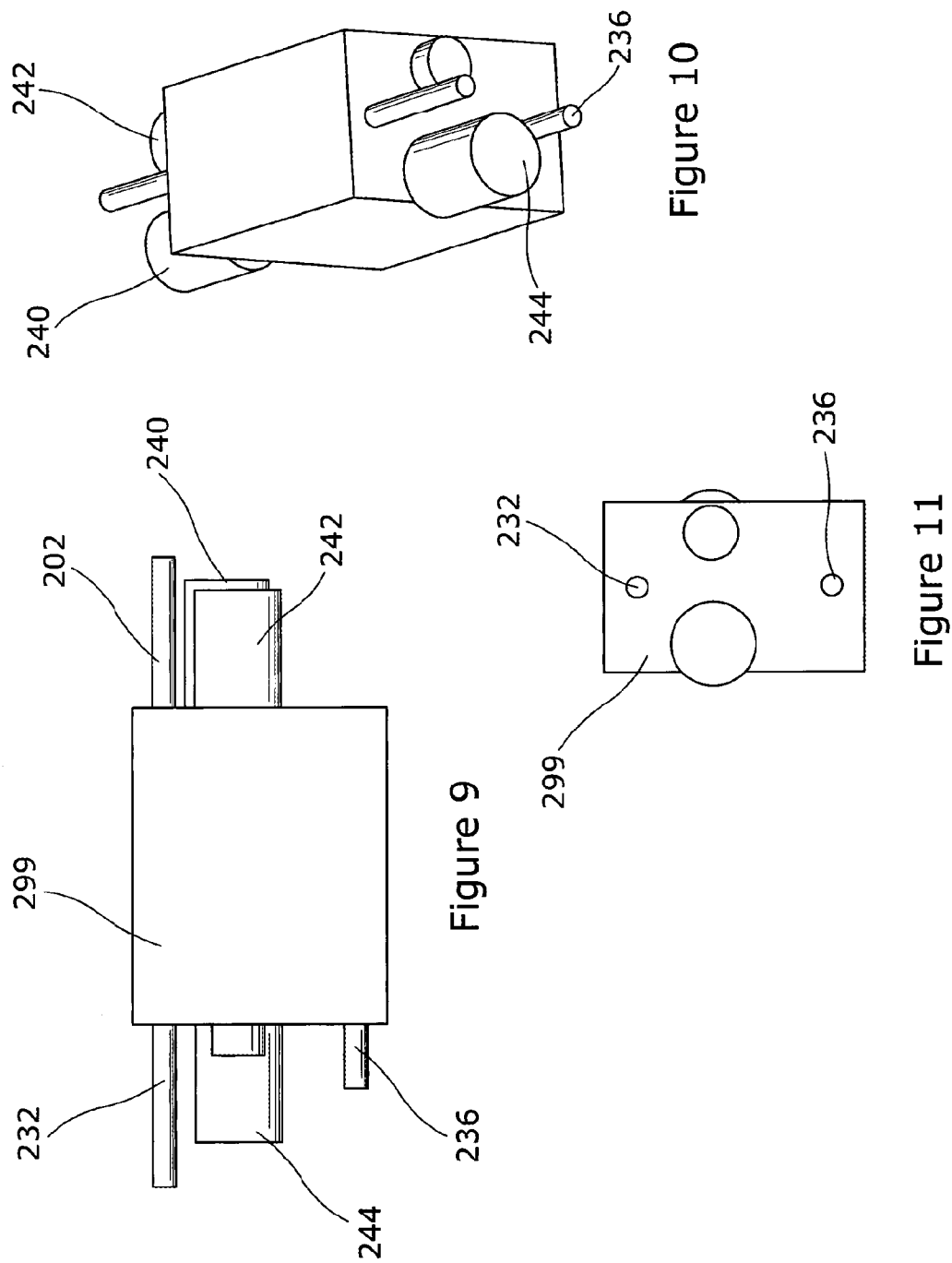

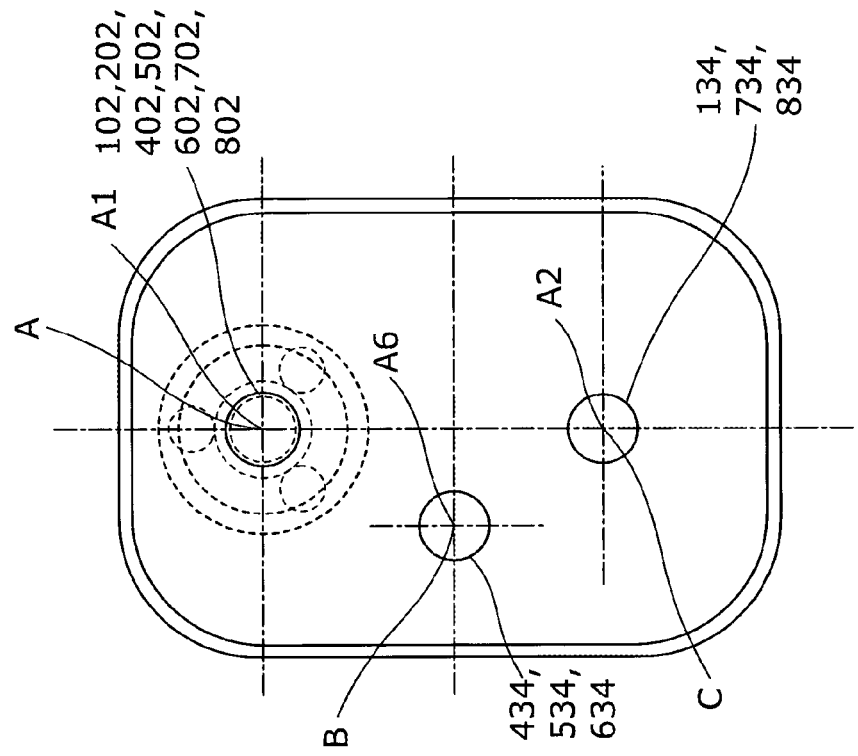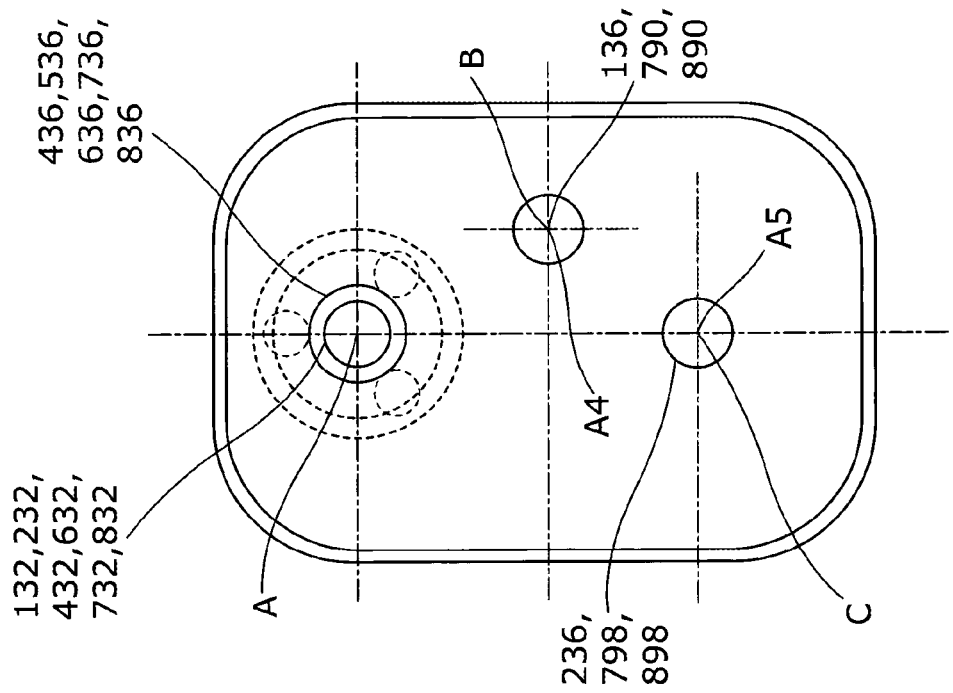

AGRICULTURAL VEHICLE TRANSMISSION

BACKGROUND OF THE INVENTION

Field of Invention

The present invention relates to vehicle transmissions and in particular, but not exclusively, to a transmission adaptable for use with a variety of configurations of agricultural vehicles, such as tractors.

Description of Related Art

Transmissions form part of the driveline tractors. The purpose of the driveline is to transmit torque from the engine (most usually an internal combustion engine and/or or electric motor) to the wheels (or tracks as may be the case in larger tractors). In addition to the engine and transmission, the driveline may also include a flywheel; one or more clutches; a transfer box; and front, centre and rear differentials.

The configuration of the driveline depends on the specific type of tractor, for example whether the vehicle is rear wheel drive or four wheel drive, front wheel steered or centrally articulated, tracked or provided with conventional wheels and tyres. Each variation of driveline requires a different transmission layout.

Additionally, the transmission may be required to drive front and/or rear power take off (PTO) shafts to allow the tractor to operate ancillary equipment such as seed drills and bailers.

By way of an example, a rear wheel drive tractor with steered front wheels would not require a front differential or a front output shaft from the transmission, but would require a rear output shaft and a rear differential. In addition it may be provided with front and/or rear PTO shafts.

In contrast, a tracked tractor would not require an output shaft from the transmission to the front wheels, but would require a rear drive shaft and rear differential capable of splitting the torque between the left and right tracks in order to steer the tractor. Furthermore, the rear output shaft of a tracked tractor would be repositioned with respect to the tyre tractor due to the smaller size of the wheels driving the track.

Historically, the provision of different transmissions for each configuration of vehicle has necessitated the design and development of a distinct transmission for each particular application. This has led to the parallel development of transmissions for each of the following commonly provided configuration of tractor:
a) standard tractors with undriven and steered front wheels of smaller diameter and driven rear wheels of larger diameter;
b) four wheel drive standard tractors with steered and driven front wheels of smaller diameter and driven rear wheels of larger diameter; and
c) tracked tractors where only the rear track wheels, not the front idler wheels, are driven whereby the rear track wheels are at a lower level relative to the chassis.

It will therefore be appreciated that there is at present a considerable duplication of effort in designing and developing multiple variations of transmissions to fit the various configurations of vehicle.

Different configurations of vehicle require the output shafts to be positioned at differing heights relative to the input shaft. Furthermore, transmissions for agricultural vehicles such as self-propelled harvesting or application machinery may require an even greater variation in shaft vertical position than that required across the range of tractor configurations listed above.

Unlike passenger cars and trucks where the transmission is mounted on a chassis, in agricultural vehicles the transmission is often an integral (and structural) part of the chassis. As a result the space envelope for the transmission is severely restricted by the transmission casing which forms an integral part of the chassis. Furthermore, since the transmission is part of the structure of the chassis, each variation in transmission design requires structural testing thereby increasing the cost and complexity of transmission development.

To overcome this problem, it is well known to provide an additional gearbox which serves the sole purpose of adapting the vertical displacement of the output shaft (to which the axle is connected via a differential) relative to the input shaft. This arrangement is shown in FIG. 1 in which a tractor 1 has an engine 2 providing drive to a transmission 3 which in turn has a rear PTO shaft 4 and a rear output shaft 5. The rear out put shaft 5 drives a transfer box 6 and a rear axle 7 via a rear differential 11. The transfer box 6 has a front drive shaft 8 which drives a front axle 9. It can be seen that the transfer box 6 does not form part of the transmission 3 and serves to drop the front drive shaft 8 by a vertical distance A relative to the rear output shaft 5.

FIGS. 2A to 2D show alternative uses of the "bolt-on" transfer box 6 to alter the relative vertical displacements of the output shafts. FIG. 2A replicates part of the view of FIG. 2 and once again shows the relative vertical distance A between front drive shaft 8 and the rear output shaft 5 for ease comparison with FIGS. 2B to 2D. FIG. 2B shows the use of a second configuration of transfer box 6B which raises the height of the rear differential 11 by a distance B relative to the rear output shaft 5. FIG. 2C shows use of a second transfer box 6' in front of the transmission 3 in order to raise the height of the front differential (not shown for clarity) by a distance C relative to the front drive shaft 8. Lastly, FIG. 2D shows an arrangement similar to FIG. 2B in which transfer box 6D raises the height of the rear differential 11 by a distance D relative to the rear output shaft 5.

It will be evident that this solution requires additional hardware to be selectively designed and installed on the vehicle, hardware which is additional to a potentially wide range of different transmissions. This increases the cost of manufacture and the maintenance requirements of the vehicle.

It is an objective of the present invention to at least mitigate one or more of the above problems.

OVERVIEW OF THE INVENTION

According to the invention there is provided a continuously variable transmission for an agricultural vehicle, the transmission comprising a transmission casing and transmission components,
the components including:
an input shaft drivable by a prime mover,
first and second output drive shafts for connection to driven wheels of the vehicle,
a mechanical transmission branch which transfers torque mechanically from the input shaft to the first and second output shafts, and
a further transmission branch having at least one continuously variable motor,
wherein the first and second output drive shafts are additionally driven by the at least one motor so as to provide the first and second output drive shafts with continuously variable drive, and wherein the first and second output drive shafts are positioned with an offset relative to one another.

Advantageously, the provision of a transmission with two offset continuously variable output drive shafts eliminates the requirement to provide a separate transfer box in order to split the torque from a single continuously variable output drive shaft as is the case in the prior art. This makes the transmission considerably more compact and simplifies the assembly of the transmission into the tractor.

Preferably, the further transmission branch is a hydrostatic branch, the branch including a hydraulic pump driven by the input shaft and the at least one motor is a hydraulic motor driven by the pump.

Preferably, the first output drive shaft is a first rear axle drive shaft.

Preferably, the second output drive shaft is a front axle drive shaft.

Preferably, the front axle drive shaft is mechanically connected to the first rear axle drive shaft.

Preferably, the hydraulic motor drives the front axle drive shaft so as to provide hydraulic drive to both the front and first rear axle drive shafts.

Preferably, the transmission includes a second hydraulic motor hydraulically driven by the hydraulic pump.

Preferably, the second hydraulic motor drives the front axle drive shaft so as to provide hydraulic drive to both the front and first rear axle drive shafts.

Preferably, the transmission includes a third output drive shaft.

Preferably, the third output drive shaft is a second rear axle drive shaft.

Preferably, the second rear axle drive shaft extends to the rear of the transmission casing from the front axle drive shaft.

Preferably, the transmission includes a fourth output drive shaft.

Preferably, the fourth output drive shaft is a third rear axle drive shaft.

Preferably, the transmission includes a second hydraulic motor hydraulically driven by the hydraulic pump, and a fourth output drive shaft defining a third rear axle drive shaft, the second hydraulic motor driving third rear axle drive shaft so as to provide hydraulic drive to both the front and rear axle drive shafts.

Preferably, the transmission includes a planetary gear assembly to split the torque from the input shaft between the mechanical and hydraulic transmission branches.

Alternatively, the further transmission branch is an electrical branch, the branch including a generator driven by the input shaft and wherein the at least one motor is an electric motor.

Preferably, the first output drive shaft is a first rear axle drive shaft.

Preferably, the second output drive shaft is a front axle drive shaft.

Preferably, the front axle drive shaft is mechanically connected to the first rear axle drive shaft.

Preferably, the electric motor drives the front axle drive shaft so as to provide electric drive to both the front and first rear axle drive shafts.

Preferably, the transmission includes a second electric motor powered by the generator.

Preferably, the second electric motor drives the front axle drive shaft so as to provide electric drive to both the front and first rear axle drive shafts.

Preferably, the transmission includes a third output drive shaft.

Preferably, the third output drive shaft is a second rear axle drive shaft.

Preferably, the second rear axle drive shaft extends to the rear of the transmission casing from the front axle drive shaft.

Preferably, the unit includes a fourth output drive shaft.

Preferably, the fourth output drive shaft is a third rear axle drive shaft.

Preferably, the transmission includes a fourth output drive shaft defining a third rear axle drive shaft, the second electric motor driving third rear axle drive shaft so as to provide electric drive to both the front and rear axle drive shafts.

Preferably, the transmission includes a planetary gear assembly to split the torque from the input shaft between the electrical and hydraulic transmission branches.

Preferably, each of the transmission components are housed at least in part within the transmission casing.

BRIEF DESCRIPTION OF THE DRAWINGS

Further to FIGS. 1 to 2D (described above) which depict prior art relevant to the invention, the invention will now be described, by way of example only, and with reference to the following drawings, in which:

FIG. 5 is a plan view of the layout of the first transmission configuration of FIG. 4;

FIG. 6 is an elevated rear view of the layout of the first transmission configuration of FIG. 4;

FIG. 7 is a rear view of the layout of the first transmission configuration of FIG. 4;

FIG. 9 is a plan view of the layout of the second transmission configuration of FIG. 8;

FIG. 10 is an elevated rear view of the layout of the second transmission configuration of FIG. 8;

FIG. 11 is a rear view of the layout of the second transmission configuration of FIG. 8;

FIG. 17 is a schematic rear view of the transmission of the present invention;

FIG. 18 is a schematic front view of the transmission of the present invention.

DETAILED DESCRIPTION OF THE INVENTION

Figure 3:
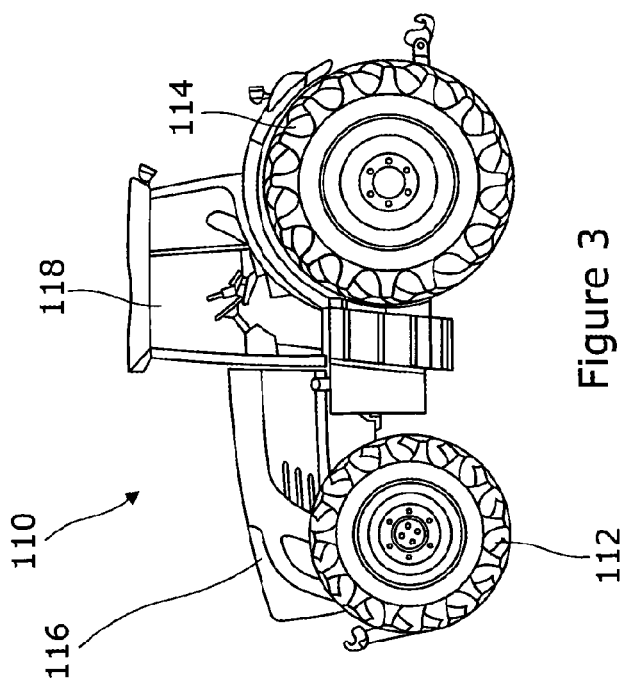
FIG. 3 is a representation of a standard tractor including a transmission according to the present invention.

FIG. 3 shows an agricultural vehicle, in the form of a tractor 110, having front wheels 112, rear wheels 114, an engine cover 116 and operator cab 118. The tractor 110 has a chassis 120 (not shown in FIG. 3 for clarity) and provides support for the tractor and a driveline 121 which provides propulsive drive. In some tractors the driveline may form part of the chassis, for example where the outer casing of a transmission and a rear transaxle is structurally integral to the chassis.

Figure 1:
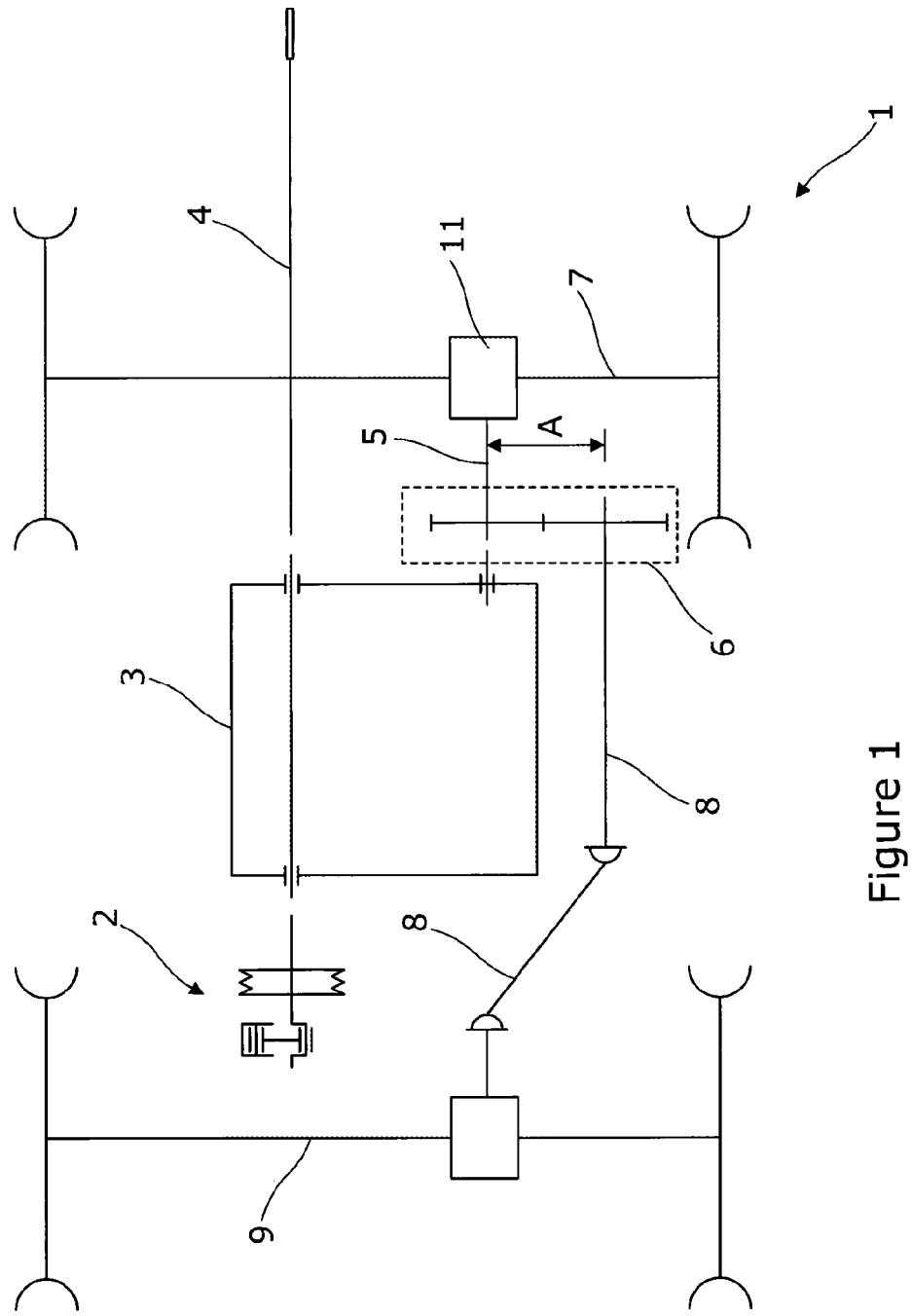
Figure 2A:
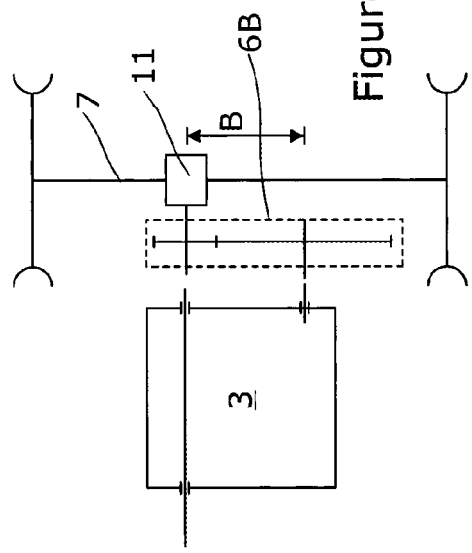
Figure 2B:
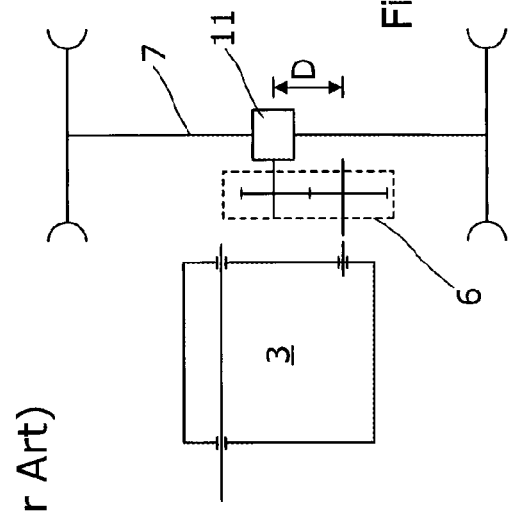
Figure 2C:
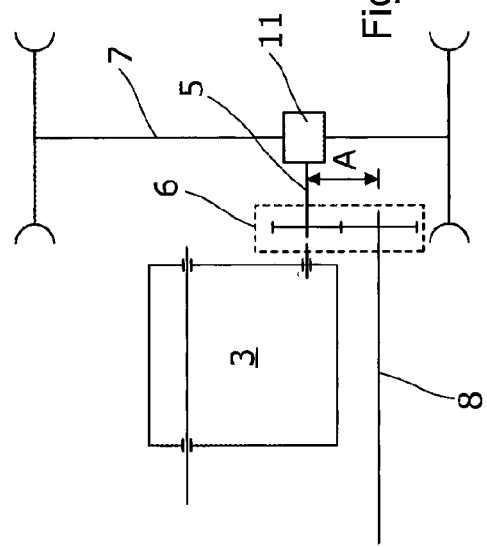
Figure 2D:
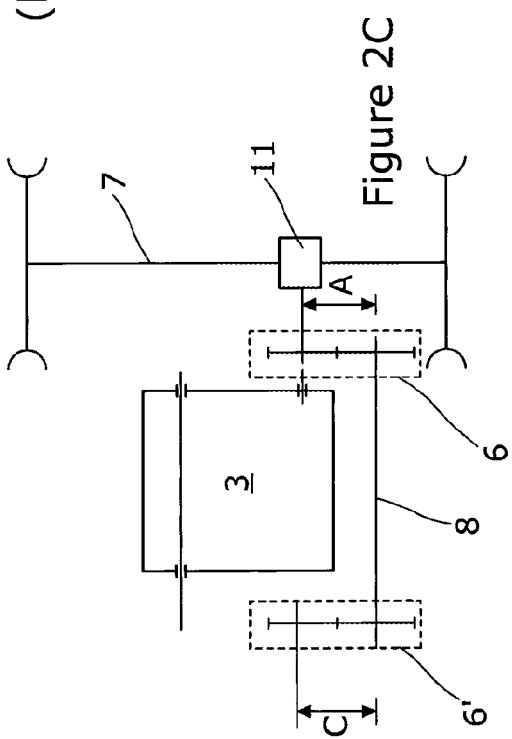
Figure 4:
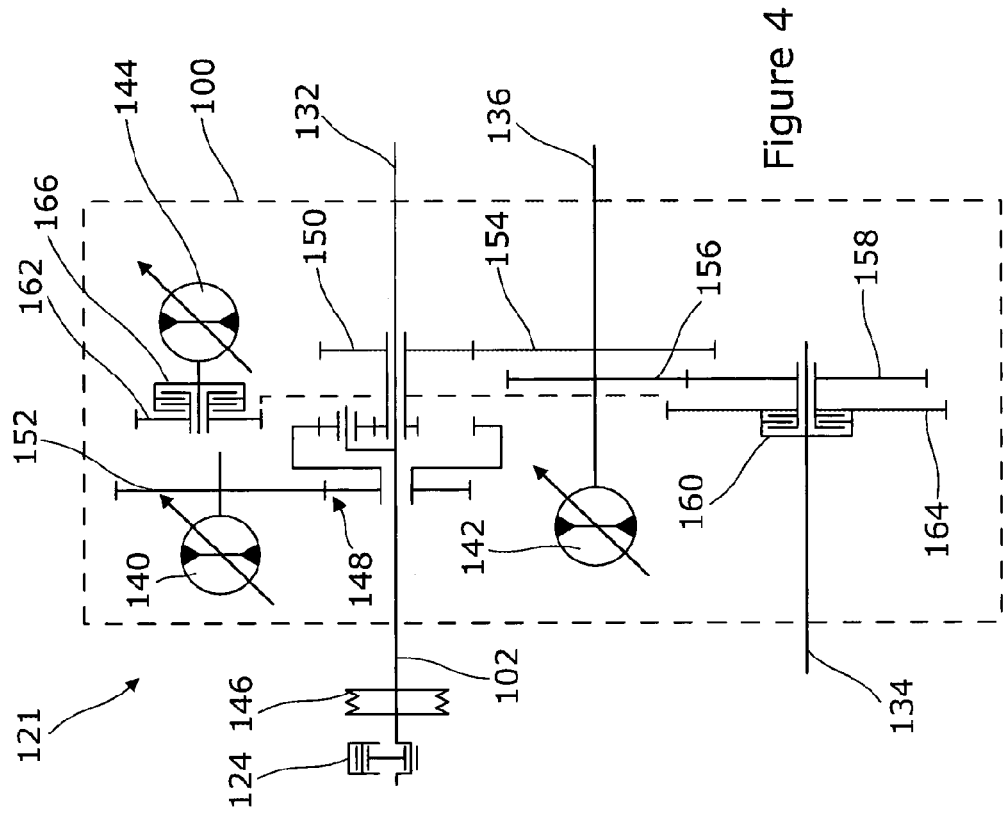
FIG. 4 is a schematic representation of the driveline of the tractor of FIG. 3, including a first configuration of the transmission of the present invention.

FIG. 4 shows the driveline 121 having a prime mover in the form of an internal combustion engine 124 and a first configuration of transmission 100 (indicated schematically in FIG. 4 by dotted line 100). The transmission 100 has an inner transmission casing 199 (not shown in FIG. 4) which is mounted inside an outer structural housing (not shown) which forms part of the chassis. Accordingly, the transmission 100, specifically the casing 199, supports or houses all of the components required to provide the full transmission output power with variable torque, variable vehicle speed and variable driving direction over a full range of vehicle speeds.

It will be appreciated that whilst the example of prime mover given is that of an internal combustion engine, it is conceivable within the scope of the invention that the prime mover could be an electric motor or other form of propulsive engine.

The configuration of the tractor 110 shown in FIGS. 3 to 7 is a four wheel drive tractor with steered front wheels. Alternatively, the tractor may be rear wheel drive only in which case the driveline 121 would not include a front differential assembly while the transmission 100 would be otherwise unchanged.

The engine 124 provides drive to the transmission 100 via a flywheel 146. The transmission 100 drives the front and rear axle drive shafts 134,136 to provide propulsive drive to the wheels 112, 114. In addition to providing propulsive drive, the transmission 100 also provides drive to a rear power take-off drive shaft 132.

The engine 124 is connected to an input shaft 102 of the transmission 100 via the flywheel 146. The input shaft 102 is connected at its inboard end to a planetary gear assembly indicated generally 148. The purpose of the planetary gear assembly 148 is to split the torque provided by the input shaft 102 between a mechanical branch indicated generally at 150 and a hydrostatic branch indicated generally at 152. On the opposite side of the planetary gear assembly to the input shaft 102 is a rear power take off shaft 132.

The hydrostatic branch 152 drives a hydraulic pump 140. The mechanical branch 150 is connected to a front axle drive shaft 134 and a rear axle drive shaft 136 as follows. Torque is transmitted from the mechanical branch 150 of the planetary gear assembly 148 to the rear axle drive shaft 136 via a rear axle gear 154. Mounted on the same shaft as the rear axle drive gear 154 is an intermediary gear 156 which in turn drives a front axle drive gear 158 which selectively drives the front axle drive shaft 134. A clutch 160 is provided to selectively engage and disengage the front axle drive shaft 134 from the rear axle drive shaft 136 or to control the ratio of torque distribution between the two axles. This allows grip to be optimised dependant on the ground conditions.

In addition to the mechanical drive path described above, the hydraulic pump 140 is hydraulically connected (not shown in FIG. 4 for clarity) to a first hydraulic motor 142 which is driveably connected to the rear axle drive shaft 136 in order to provide hydraulic drive to the rear wheels. The hydraulic pump 140 is also connected to a second hydraulic motor 144 in order to provide hydraulic drive to the front axle drive shaft 134 as follows. The motor 144 is driveably connected to the front axle drive shaft 134 via first and second hydraulic motor gears 162, 164. A clutch 166 allows the second hydraulic motor 144 to be selectively engaged and disengaged from the front axle drive shaft 134. This allows hydraulic drive to be provided to the front axle drive shaft 134 by the second hydraulic motor 144 in addition to, or alternatively to, the drive delivered to the front axle drive shaft 134 from the rear axle drive shaft 136 via the intermediary and front axle drive gears 156, 158, depending on the extent of engagement of the clutch 160.

Second hydraulic motor 144 is connected to front axle drive shaft 134 by gears 162, 164 having a high transmission ratio. This allows motor 142 to provide high torque at a limited, lower range of vehicle speeds. Consequently, at higher vehicle speeds, the motor 144 may be disconnected from driveline 121 via clutch 166. Due to the layout, the first hydraulic motor 144 is provided for delivering lower torque but over the full range of vehicle speeds. However, in combination, both motors 142, 144 enable the transmission to provide a full transmission output power with variable torque, variable vehicle speed and variable driving direction over a full range of vehicle speeds. The rear axle drive shaft 136 provides drive to the rear wheels 114. Similarly, the front axle drive shaft 134 provides drive to the front wheels 112.

By way of further explanation, various drive configurations are possible depending on the operating positions of clutches 160 and 166:

With the clutch 160 disengaged, and the clutch 166 engaged, motor 142 drives the rear axle drive shaft 136 and thereby rear axle 114, and motor 144 drives the front axle drive shaft 134 and thereby front axle 112.

With the clutch 160 disengaged, and the clutch 166 disengaged, motor 142 drives the rear axle drive shaft 136 and thereby rear axle 114. The front axle drive shaft 134 and thereby front axle 112 is not driven.

With the clutch 160 engaged, and the clutch 166 disengaged, motor 142 drives the rear axle drive shaft 136 and thereby rear axle 114. The motor 142 also drives the front axle drive shaft 134 and thereby front axle 112.

With the clutch 160 engaged, and the clutch 166 engaged, motor 142 and motor 144 both drive the rear axle drive shaft 136 and thereby rear axle 114. The motors 142, 144 also drive the front axle drive shaft 134 and thereby front axle 112.

With the clutch 160 variably controlled, and the clutch 166 engaged, torque supplied by motor 142 to the front axle drive shaft 134 and thereby front axle 112 can be adapted.

Referring now to FIGS. 5, 6 and 7, the input shaft 102, rear power take-off drive shaft 132, front axle drive shaft 134 and a rear axle drive shaft 136 are visible at the exterior of the an inner transmission casing 199. The transmission 100 has a blanking cap 138 which covers an aperture in the inner transmission casing 199 for an additional drive shaft not used in this first configuration of transmission. In addition, the hydraulic pump 140, first hydraulic motor 142 and second hydraulic motor 144 are shown mounted to the inner transmission casing 199.

In use, the operator is able to vary the division of torque provided by the transmission 100 either mechanically or hydraulically by varying the amount of hydraulic assistance provided by the first and second hydraulic motors.

The transmission of the present invention is also suitable for a tracked tractor as will now be described in further detail.

Figure 8:
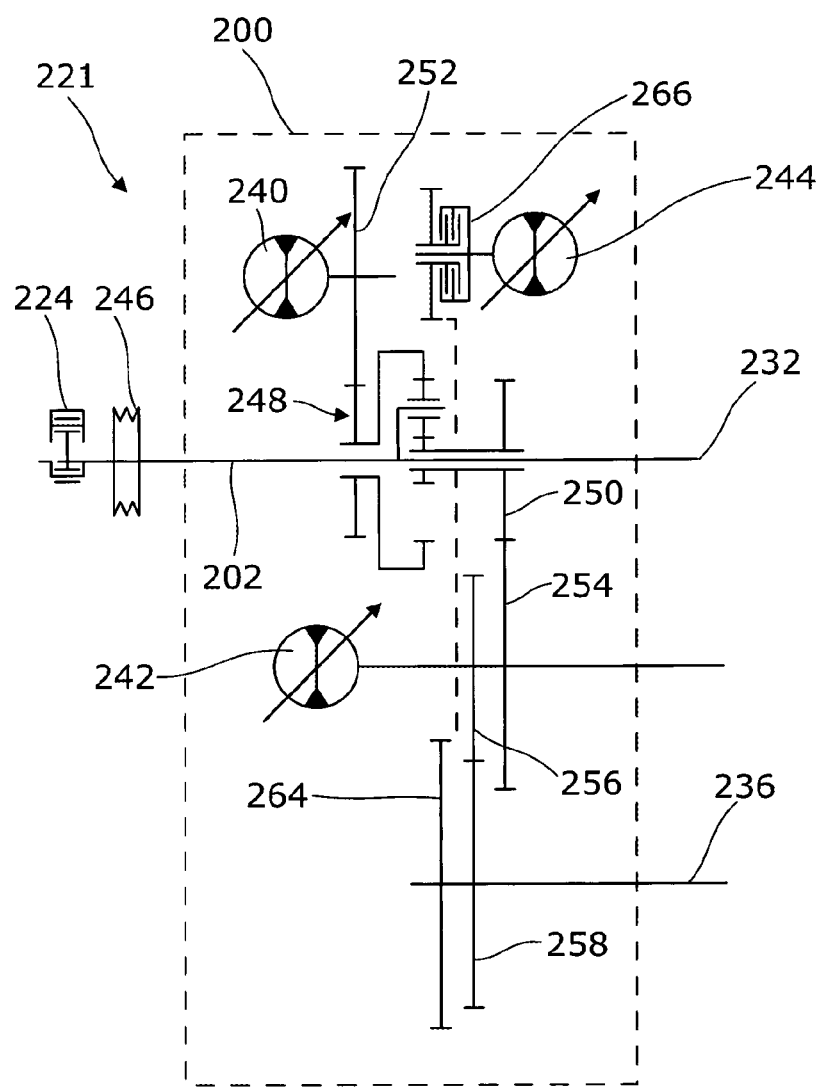
FIG. 8 is a schematic representation of an alternative tractor driveline including a second configuration of the transmission of the present invention.

FIG. 8 shows the driveline 221 for a tracked tractor having an engine 224 which drives a second configuration of transmission 200 which in turn provides drive to a rear axle drive shaft 236. The rear axle drive shaft 236 provides drive to the rear drive wheels (not shown) which in turn drive the track. As a result there is no requirement for a front axle drive shaft since no drive is transmitted to the front wheels.

The engine 224 provides drive to the transmission 200 via a flywheel 246. In addition to providing propulsive drive to the rear axle drive shaft 236, the transmission 200 also provides drive to a rear power take-off drive shaft 232. The engine 224 is connected to the input shaft 202 of transmission 200 via the flywheel 246. The input shaft 202 is connected at its inboard end to a planetary gear assembly indicated generally 248. The purpose of the planetary gear assembly 248 is to split the torque provided by the input shaft 202 between a mechanical branch indicated generally at 250 and a hydrostatic branch indicated generally at 252. On the opposite side of the planetary gear assembly 248 to the input shaft 202 is the rear PTO drive shaft 232.

The hydrostatic branch 252 drives first and second hydraulic motors 242, 244 via hydraulic pump 240 while the mechanical branch 250 provides drive to the rear axle drive shafts 236 as follows. Torque is transmitted from the mechanical branch 250 of the planetary gear assembly 248 to the rear axle drive shaft 236 via initial gear 254. Mounted on the same shaft as the initial gear 254 is an intermediary gear 256 which in turn drives a rear axle drive gear 258. The rear axle drive gear 258 is mounted on and thereby drives the rear axle drive shaft 236. A steering differential (not shown) is provided to split the torque delivered by the rear axle drive shaft 236 between the left and right rear drive wheels in order to steer the tractor 210.

In addition to the mechanical drive path described above, the hydraulic pump 240 is hydraulically connected (not shown in FIG. 5 for clarity) to the first hydraulic motor 242 which is driveably connected to the rear axle drive shaft 236 via the intermediary gear 256 and rear axle drive gear 258 in order to provide supplementary hydraulic drive to the rear drive wheels 212. The hydraulic pump 240 is also connected to the second hydraulic motor 244 which is driveably connected to the rear axle drive shaft 236 via second hydraulic motor gear 264. A clutch 266 allows the second hydraulic motor 244 to be selectively engaged and disengaged from the rear axle drive shaft 236. This allows hydraulic drive to be provided to the rear axle drive shaft 236 by the second hydraulic motor 244 in addition to, or alternatively to, the drive delivered by the first hydraulic motor 242 and the mechanical branch 250 of the planetary gear assembly 248.

Referring now to FIGS. 9, 10 and 11 the input shaft 202, rear power take-off drive shaft 232, and rear axle drive shaft 236 are visible at the exterior of the inner transmission casing 299. It will be noted that the transmission 200 does not have the blanking cap 138 of the transmission 100. Instead the transmission 200 uses the aperture covered by the blanking cap 138 in transmission 100 to provide access for the rear axle drive shaft 236. Also the transmission 200 has no front axle drive shaft as the tracked tractor 210 requires no drive to the front wheels. Furthermore, the transmission 200 is not provided with clutch 166 of transmission 100 as there is no need for torque distribution.

In addition, the hydraulic pump 240, and the first and second hydraulic motors 242, 244 are shown mounted to the inner transmission casing 299.

It will be appreciated that the transmission of the present invention can be configured to provide a configuration of transmission 100 for tractor 110 or transmission 200 for tractor 210 wherein the drive shafts 136, 134, 236 can be positioned at a different vertical distance to e.g. the input shaft 202. Furthermore the drive shafts 136, 134, 236 are positioned at the appropriate vertical shaft level and provided with the respective transmission ratio/output speed to meet the requirements of different wheel sizes over different vehicles. Drive shaft 136 is provided with the respective gear ratio suitable to drive a big size rear wheel of a standard tractor. Drive shaft 134 is provided with the respective gear ratio suitable to drive a smaller rear wheel of a standard tractor. Drive shafts 136 is provided with the respective gear ratio suitable to drive a mid size drive wheel to drive the track of a track-type tractor. This design eliminates the requirement for transfer boxes when used in different vehicle types.

In each configuration, the inner transmission casing (199, 299) and many of the internal components remain the same. This provides significant advantages, for example a reduction in the complexity of production of the transmissions across a range of tractors typically offered by agricultural manufacturers.

The transmission unit 26 can provide further configurations of transmission to suit a large range of applications. Further alternative transmission configurations of transmission will now be described with reference to FIGS. 12 to 19. Each transmission is similar in construction and operation to transmissions 100, 200 described above and all provide at least two continuously variable output drive shafts. The modes of operation of each of the transmissions of FIGS. 12 to 19 will only be described in detail where they differ significantly from transmissions 100, 200 described above.

Figure 12:
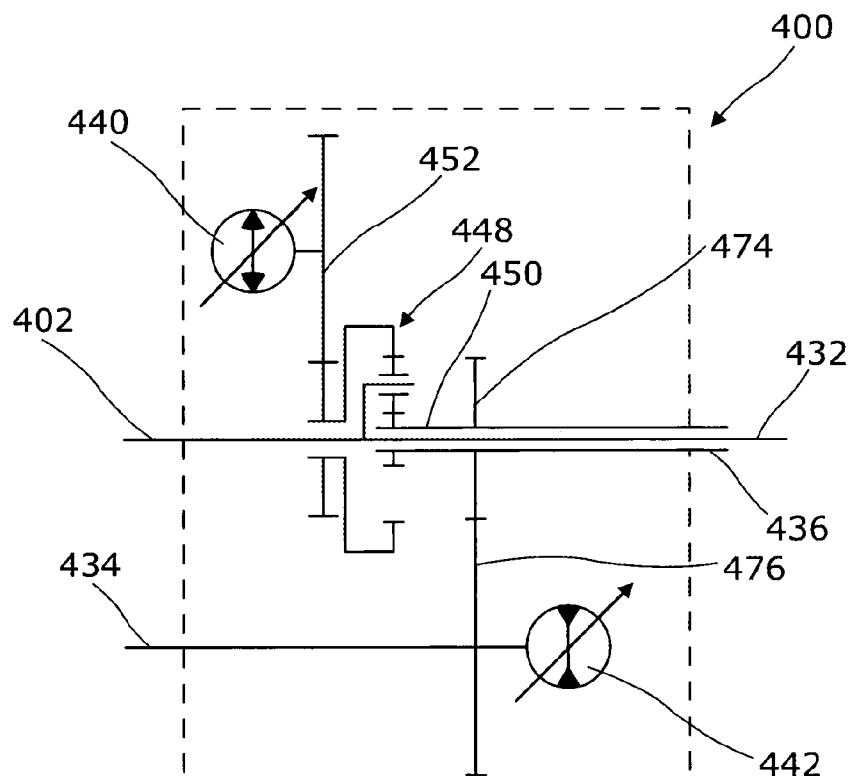
FIG. 12 is a schematic representation of a third transmission configuration of the transmission of the present invention.
Figure 13:
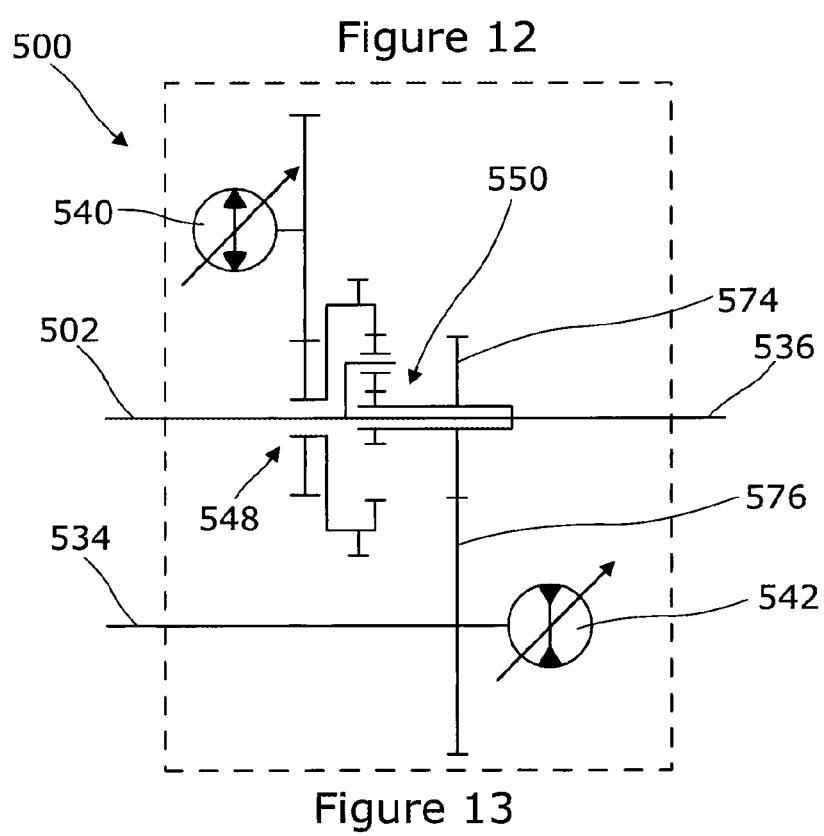
FIG. 13 is a schematic representation of a fourth transmission configuration of the transmission of the present invention.

Referring initially to FIG. 12, a configuration of transmission 400 has an input shaft 402 which drives a planetary gear system 448 with a mechanical branch 450 and a hydraulic branch 452. The hydraulic branch 450 drives a hydraulic pump 440 which provides hydraulic power to a hydraulic motor 442. The input shaft 402 passes through the planetary gear system 448 and exits the transmission at the rear as a rear PTO drive shaft 432. The rear PTO drive shaft 432 is co-axial with, and positioned diametrically within, a rear axle drive shaft 436. A front axle drive shaft 434 is driven by the hydraulic motor 442 and the mechanical branch 450 via gears 474, 476. The hydraulic motor 442 is also able to power the rear axle drive shaft 436 via gears 474, 476.

Figure 14:
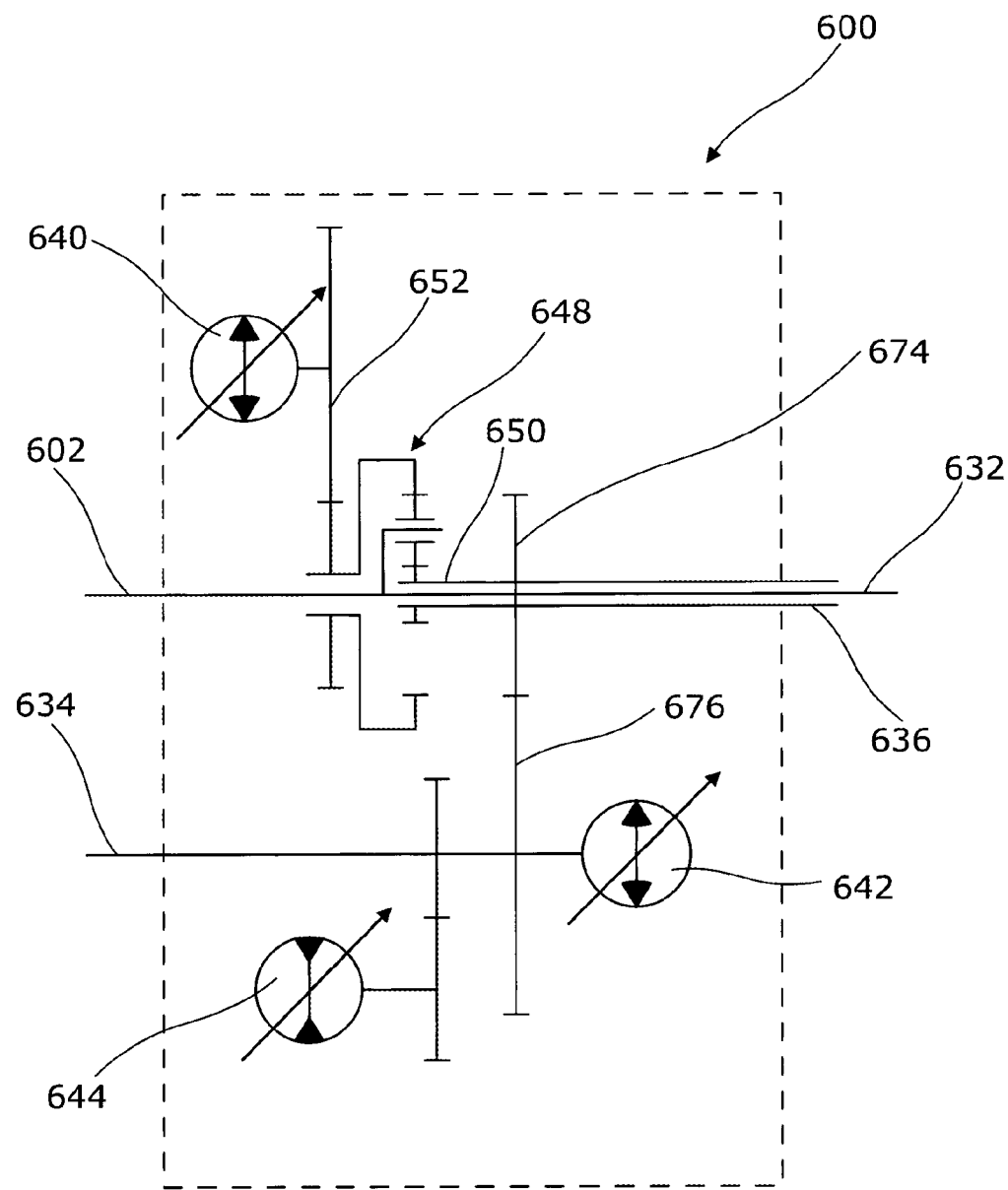
FIG. 14 is a schematic representation of a fifth transmission configuration of the transmission of the present invention.

FIG. 14 shows a further configuration of transmission 500. The transmission 500 has an input shaft 502, front axle drive shaft 534, rear axle drive shaft 536, gears 574, 576, hydraulic pump 540 and hydraulic motor 542 in common with transmission 400. Compared to the transmission 400 shown in FIG. 12 no PTO shaft is provided as the hollow shaft extending to the rear of the planetary gear system 548 is connected to the rear axle drive shaft 536. This arrangement may be suitable for a truck not requiring a rear PTO.

The transmission 600 of FIG. 14 differs from transmission 400 (with identical components being numbered 200 higher in FIG. 14 than in FIG. 12) in that it has a second hydraulic motor 644 which acts in cooperation with the first hydraulic motor 642 to drive the front axle drive shaft 634 and rear axle drive shaft 636. The second motor 644 could also be provided in the embodiments shown in FIGS. 6 and 7.

Figure 15:
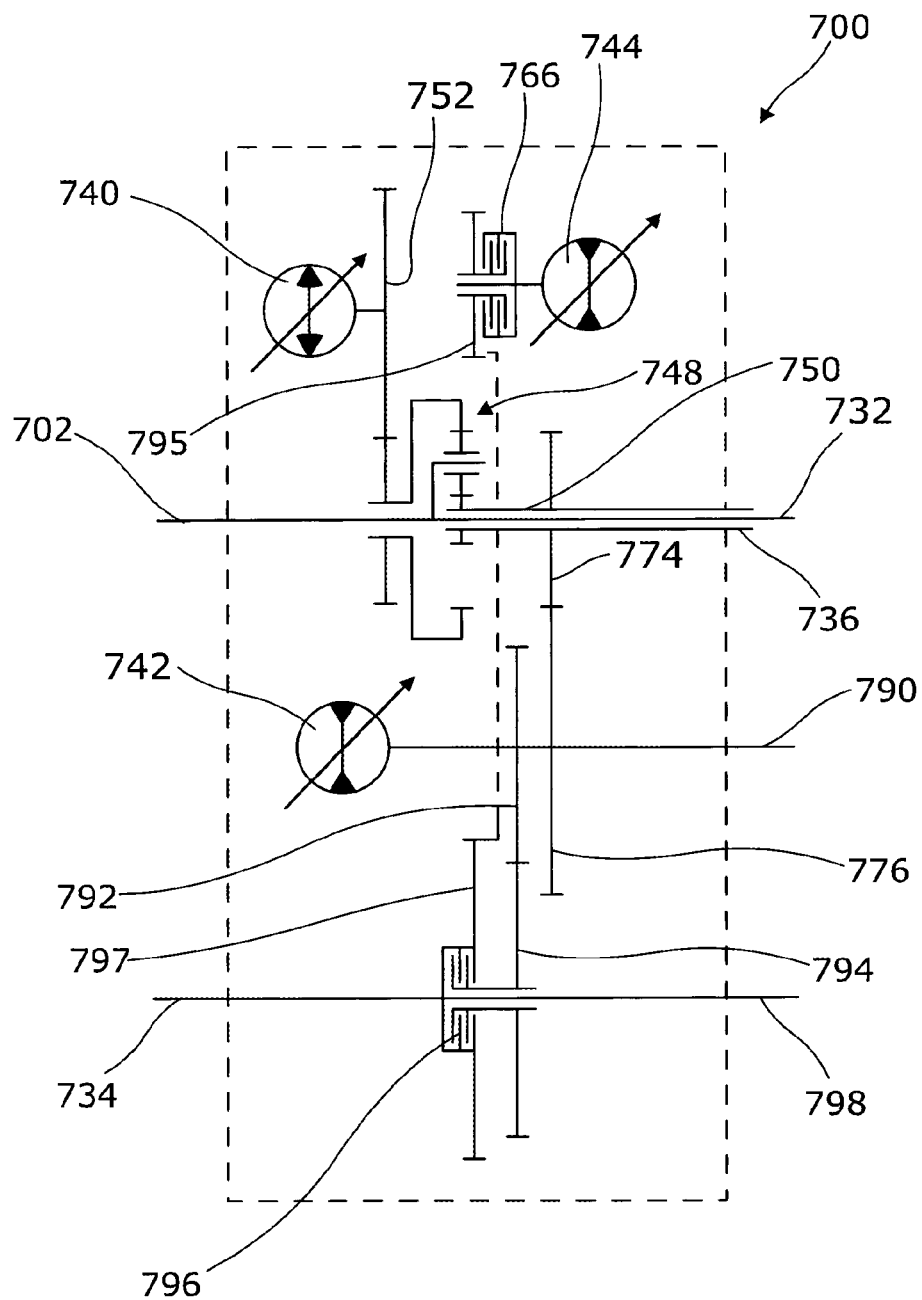
FIG. 15 is a schematic representation of a sixth transmission configuration of the transmission of the present invention.

Referring now to FIG. 15, the transmission 700 has an input shaft 702 driving a planetary gear system 748 with a mechanical branch 750 and a hydraulic branch 752. The hydraulic branch 752 drives a hydraulic pump 740 which provides hydraulic power to first and second hydraulic motors 742, 744. The input shaft 702 passes through the planetary gear system 748 and exits the transmission at the rear as a rear PTO drive shaft 732. The rear PTO drive shaft 432 is co-axial with, and positioned diametrically within, a first rear drive shaft 736. A second rear drive shaft 790 is driven by the first hydraulic motor 742 and the mechanical branch 750 via gears 774, 776. The first hydraulic motor 742 is also able to power the first rear drive shaft 736 via gears 774, 776. A front axle drive shaft 734 is driven by the first hydraulic motor 742 and mechanical branch 750 of the planetary gear system 748 via gears 792, 794 and clutch 796. Attached to the other end of the front axle drive shaft 734 is a third rear drive shaft 798. The front axle drive shaft 734 and third rear drive shaft 798 are selectively driven by the second hydraulic motor 744 via clutch and gears 795, 797. In such a manner the clutch 766 can be engaged to enable the second hydraulic motor 744 to drive the first and second rear drive shafts 736, 790 via the gears 795, 797, 794, 792, 776 and 774. The clutch 796 can be engaged to mechanical drive and hydraulic drive to the front axle drive shaft 734 and third rear drive shaft 798. As the clutch 796 is summing up the torque delivered by motors 742 and 744 via circumferential toothed portions, the front axle drive shaft 734 can extend through clutch 796 to provide third rear drive shaft 798.

The configuration of transmission 700 may be used to drive a vehicle with more than two driven axles as follows.

In a vehicle with three axles, the front axle of the vehicle may be connected to front axle drive shaft 734, a mid vehicle axle may be connected to third rear drive shaft 798 while the rear vehicle axle may be connected to second rear drive shaft 790. In addition, rear PTO drive shaft 432 may drive a PTO.

In a vehicle with four axles, the front (first) axle of the vehicle may be connected to front axle drive shaft 734, a mid (second) vehicle axle may be connected to third rear drive shaft 798 while the first rear (third) vehicle axle may be connected to first rear drive shaft 736. In addition, the second rear (fourth) vehicle axle may be connected to first rear drive shaft 736. The rear PTO drive shaft 432 would not be used in this case.

Figure 16:
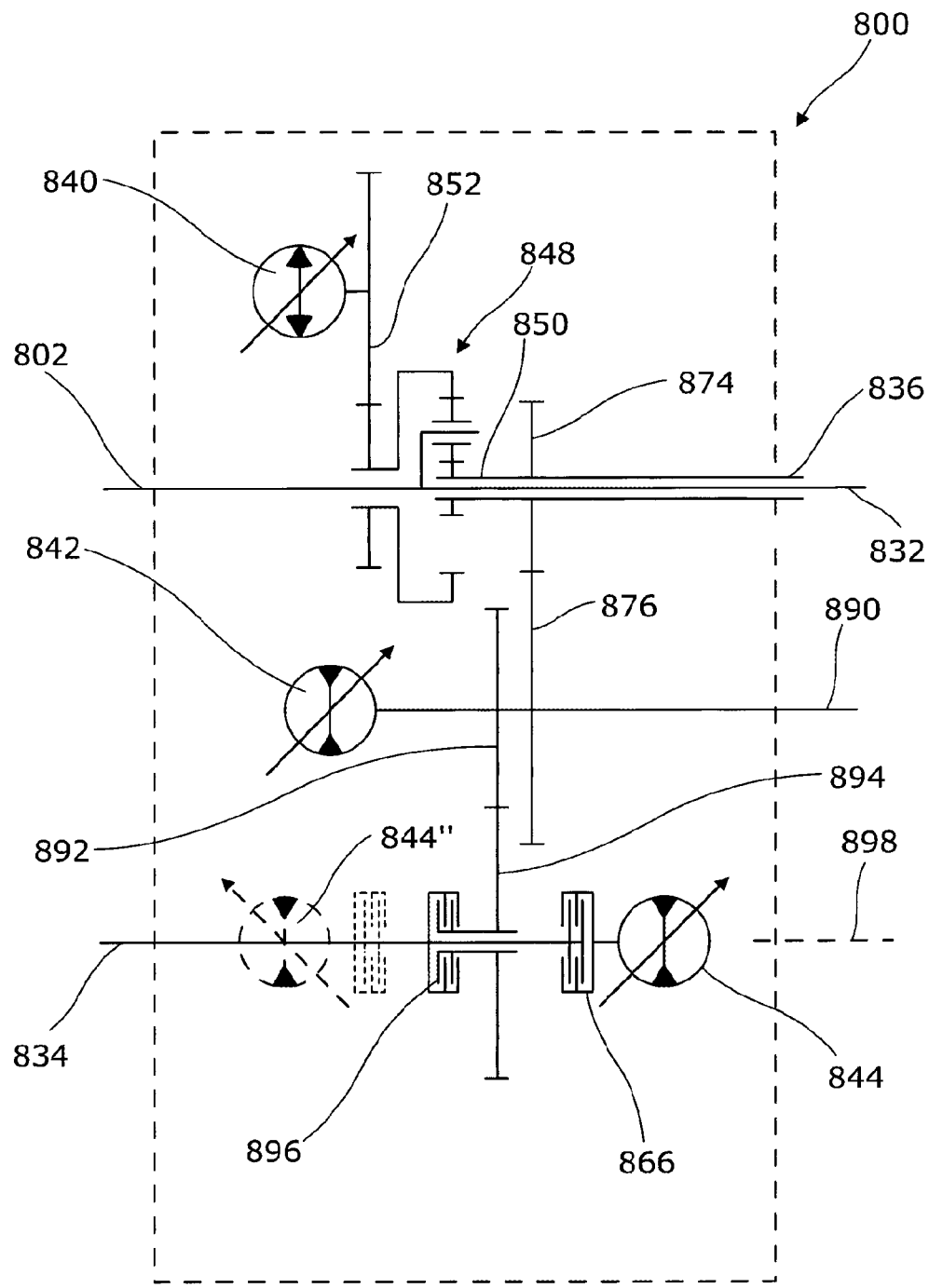
FIG. 16 is a schematic representation of a seventh transmission configuration of the transmission of the present invention.

The transmission 800 of FIG. 16 differs from transmission 700 (with identical components being numbered 100 higher in FIG. 16 than in FIG. 15) in that second hydraulic motor 844 is positioned in line with the front axle drive shaft 834 in order to selectively (via clutches 866 and 896) drive the front axle drive shaft 834 and rear drive shafts 836, 890. The second hydraulic motor 844 is shown in an alternative location 844" by dashed lines in FIG. 16 in which embodiment the front axle drive shaft 834 is removed in order to provide access for the motor 844" and a third rear drive shaft 898 is provided instead.

Figure 19:
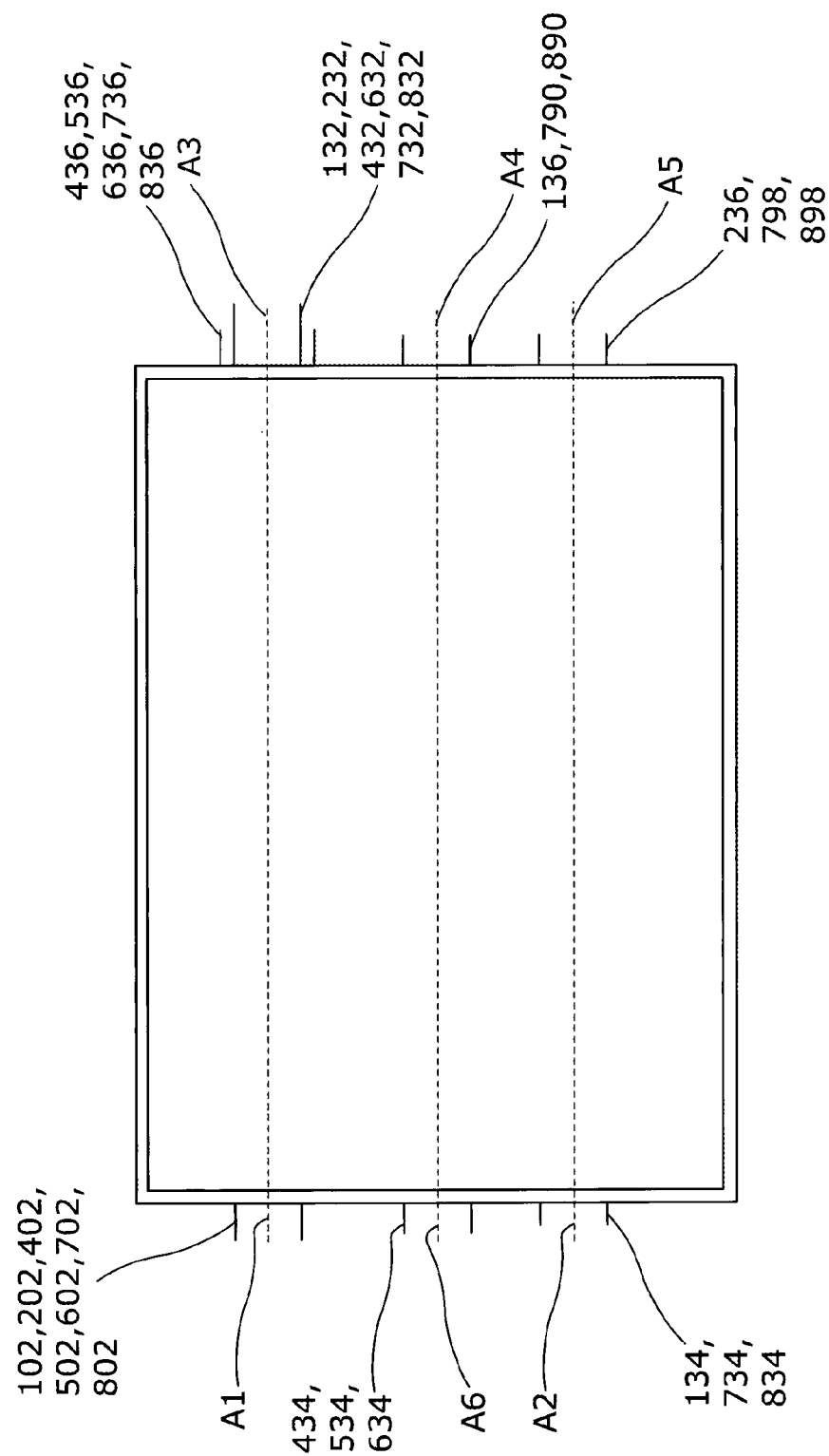
FIG. 19 is a schematic side view of the transmission of the present invention.

In FIG. 17, the rear wall of the transmission unit 26 is depicted showing the shaft positions of configurations of transmission 100, 200, 400, 500, 600, 700 and 800. FIGS. 18 and 19 show the shaft positions in front wall and side walls, respectively.

The input shaft 102, 202, 402, 502, 602, 702, 802 enters the transmission unit 26 through aperture A1. The rear PTO drive shaft 132, 232, 432, 632, 732, 832 is positioned coaxially within the rear axle drive shaft 436, 536, 636, 736, 836 at position A exiting the transmission unit through aperture A3. Alternatively (or additionally in the case of transmissions 700, 800) the rear axle drive shaft 136, 790, 890 is provided at an intermediate position B exiting the transmission unit through aperture A4. In transmissions 400, 500 and 600 the front axle drive shaft 434, 534, 634 exits the front of the transmission casing at position B through aperture A6. Alternatively (or additionally in the case of transmissions 700, 800) the rear axle drive shaft 236, 798, 898 is provided at a low position C exiting the transmission unit through aperture A5. Alternatively (or additionally in the case of transmissions 700) the front axle drive shaft 134, 734, 834 exits the front of the transmission casing at position C through aperture A2.

Accordingly, the configurations of transmission described above provide the full transmission output power with variable torque, variable vehicle speed and variable driving direction over a full range of vehicle speeds. This is in contrast to prior art transmissions (see FIGS. 1 and 2A to 2D) in which only a single drive shaft is provided which can achieve a continuously variable torque delivery across the range of vehicle speeds. Rather, in the prior art devices (depicted in FIGS. 1 and 2A to 2D) a supplementary transfer box 6 must be provided in order to split the drive from the single output shaft 5 to the front and rear axles.

The transmission of the present invention therefore achieves considerable space saving and a reduction in mechanical components over the prior art transmissions as the requirement for a separate transfer box is eliminated by the provision of two continuously variable output shafts separated by an offset relative to one another, one for providing drive to the rear wheels the other for providing drive to the front wheels.

The embodiments of transmission described above all have a hydrostatic branch defined by a pump (driven by the input shaft) and two motors which are driven by the pump.

In an alternative embodiment the hydrostatic branch is replaced by an electrical branch in which the hydraulic pump is replaced by an electrical generator (driven by the input shaft) and the hydraulic motors are replaced by electric motors.

In the specific embodiments the transmission unit 26 is surrounded by an additional structural housing integral with the chassis of the tractor. This is especially advantageous for assembly and maintenance reasons.

Alternatively, and without departing from the scope of the invention, the transmission unit 26 could incorporate the structural housing in place of the inner transmission casing 199. In this case, all the components included in each configuration of the transmission unit 26 described above would be directly assembled to the structural housing.

Furthermore, the embodiments described above are based on an orientation of the transmission which is common in agricultural vehicles such as tractors, that is to say that the engine is at the front and the transmission is positioned rearwards of the engine relative to the driving direction. This results in the front axle being situated in front of the transmission while the rear axle is behind the transmission. However it is conceivable that the orientation of the transmission or the engine could be altered, e.g. for bucket loaders having a rear engine, would result in a different orientation of the vehicle front and rear axle(s) in relation to the transmission. So the reference of to front or rear axle must be more seen with reference to the transmission than strictly to the vehicle.

The invention claimed is:

1. A continuously variable transmission for an agricultural vehicle, the transmission comprising a transmission casing and transmission components, the components including:

an input shaft drivable by a prime mover, first and second output drive shafts for connection to driven wheels of the vehicle, a mechanical transmission branch which transfers torque mechanically from the input shaft to the first and second output shafts, and a further transmission branch having at least one continuously variable motor, wherein the first and second output drive shafts are additionally driven by the at least one continuously variable motor so as to provide the first and second output drive shafts with continuously variable drive, and wherein the first and second output drive shafts are positioned with an offset relative to one another, wherein the further transmission branch is a hydrostatic branch, comprising a hydraulic pump driven by the input shaft, and the at least one continuously variable motor is a hydraulic motor driven by the pump, wherein the first output drive shaft is a first rear axle drive shaft, and wherein the second output drive shaft is a front axle drive shaft, the front axle drive shaft mechanically connected to the first rear axle drive shaft, wherein the at least one continuously variable hydraulic motor drives the front axle drive shaft so as to provide hydraulic drive to both the front and first rear axle drive shafts, wherein the transmission includes a second hydraulic motor hydraulically driven by the pump, wherein the second hydraulic motor drives the front axle drive shaft so as to provide hydraulic drive to both the front and first rear axle drive shafts, wherein the transmission includes a third output drive shaft, wherein the third output drive shaft is a second rear axle drive shaft, wherein the transmission includes a fourth output drive shaft defining a third rear axle drive shaft, and wherein the second hydraulic motor drives the third rear axle drive shaft so as to provide hydraulic drive to both the front and rear axle drive shafts.

2. The continuously variable transmission of claim 1, wherein each of the transmission components are housed at least in part within the transmission casing.

3. The continuously variable transmission of claim 1, wherein the offset is arranged in vertical or horizontal positions.

4. The continuously variable transmission of claim 1, wherein the third output drive shaft is driven by the mechanical transmission branch and additionally driven by the further transmission branch.

5. The continuously variable transmission of claim 1, wherein the transmission includes a planetary gear assembly to split the torque from the input shaft between the mechanical transmission branch and the further transmission branch.

6. A continuously variable transmission for an agricultural vehicle, the transmission comprising a transmission casing and transmission components, the components including:

an input shaft drivable by a prime mover, first and second output drive shafts for connection to driven wheels of the vehicle, a mechanical transmission branch which transfers torque mechanically from the input shaft to the first and second output shafts, and a further transmission branch having at least one continuously variable motor, wherein the further transmission branch is an electrical branch, the branch including a generator driven by the input shaft and wherein the at least one continuously variable motor is an electric motor, wherein the first and second output drive shafts are additionally driven by the at least one continuously variable motor so as to provide the first and second output drive shafts with continuously variable electric drive, and wherein the first and second output drive shafts are positioned with an offset relative to one another, wherein the first output drive shaft is a first rear axle drive shaft, and wherein the second output drive shaft is a front axle drive shaft, the front axle drive shaft mechanically connected to the first rear axle drive shaft, wherein the at least one continuously variable electric motor drives the front axle drive shaft so as to provide electric drive to both the front and first rear axle drive shafts, wherein the transmission includes a second electric motor driven by the generator, wherein the second electric motor drives the front axle drive shaft so as to provide electric drive to both the front and first rear axle drive shafts, wherein the transmission includes a third output drive shaft, wherein the third output drive shaft is a second rear axle drive shaft, and wherein the transmission includes a fourth output drive shaft defining a third rear axle drive shaft, the second electric motor driving the third rear axle drive shaft so as to provide electric drive to both the front and rear axle drive shafts.

7. A continuously variable transmission for an agricultural vehicle, the transmission comprising a transmission casing and transmission components, wherein each of the transmission components are housed at least in part within the transmission casing, the components including:

an input shaft drivable by a prime mover, first and second output drive shafts for connection to driven wheels of the vehicle, a mechanical transmission branch which transfers torque mechanically from the input shaft to the first and second output shafts, and a further transmission branch having at least one continuously variable motor, wherein the first and second output drive shafts are additionally driven by the at least one continuously variable motor so as to provide the first and second output drive shafts with continuously variable drive, and wherein the first and second output drive shafts are positioned with an offset relative to one another, the further transmission branch comprising a pump or generator driven by the input shaft, the at least one continuously variable motor driven by the pump or generator, wherein the first output drive shaft is a first rear axle drive shaft, and wherein the second output drive shaft is a front axle drive shaft, the front axle drive shaft mechanically connected to the first rear axle drive shaft, wherein the at least one continuously variable motor drives the front axle drive shaft so as to provide continuously variable drive to both the front and first rear axle drive shafts, wherein the transmission includes a second motor driven by the pump or generator, wherein the second motor drives the front axle drive shaft so as to provide drive to both the front and first rear axle drive shafts, and wherein the transmission includes a third output drive shaft, and a second rear axle drive shaft extends to the rear of the transmission casing from the front axle drive shaft.

8. The continuously variable transmission of claim 7, wherein the transmission includes a fourth output drive shaft.

9. The continuously variable transmission of claim 8, wherein the fourth output drive shaft is a third rear axle drive shaft.

10. The continuously variable transmission of claim 7, wherein the transmission includes a planetary gear assembly to split the torque from the input shaft between the mechanical transmission branch and the further transmission branch.

* * * * *